United States Patent [19]

Jackson et al.

[11] Patent Number: 4,751,443

[45] Date of Patent: Jun. 14, 1988

[54] SERVO SIMULATOR

[75] Inventors: Joseph W. Jackson, Glendale, Ariz.; Theodore C. Ebbinga, Everett, Wash.

[73] Assignee: Honeywell Inc., Minneapolis, Minn.

[21] Appl. No.: 888,558

[22] Filed: Jul. 22, 1986

[51] Int. Cl.[4] .......................... G05B 13/00; B64C 5/00

[52] U.S. Cl. .................................... 318/580; 318/561; 364/149; 244/75 R

[58] Field of Search ........................ 318/580, 582, 561; 364/149, 150, 151; 244/76 R, 75 R, 76 A, 175, 177, 178, 179, 180, 181, 194, 195, 182

[56] References Cited

U.S. PATENT DOCUMENTS

| | | | |
|---|---|---|---|
| 3,057,584 | 10/1962 | Bretoi | 364/150 X |
| 3,221,229 | 11/1965 | Kezer | 318/561 |
| 4,092,716 | 5/1978 | Berg | 364/150 X |
| 4,500,823 | 2/1985 | Walrath | 318/561 X |
| 4,540,923 | 9/1985 | Kade | 318/561 |

*Primary Examiner*—William M. Shoop, Jr.
*Assistant Examiner*—Patrick C. Keane
*Attorney, Agent, or Firm*—Arnold L. Albin; Seymour Levine

[57] ABSTRACT

A servo system simulator utilizing an electronic equivalent of the servomotor to drive a programmable electronic load which mimics the actual load encountered by the servo system simulated.

10 Claims, 3 Drawing Sheets

SERVO SIMULATOR

BACKGROUND OF THE INVENTION

1. Field of the Invention

The present invention relates to servomechanisms and more specifically to electronically simulated servomotors for use in designing servomechanical systems.

2. Description of the Prior Art

The development of a complex servo system often entails the construction of a laboratory prototype in which the control portion of the system actuates a servomotor that drives a physical load having the same properties as the mechanical system to be driven in the finished product.

For example, in the development of aircraft autopilot systems, the autopilot portion of the system develops position control signals which are applied to electric servomotors. Mechanical apparatus is used to apply a load to the motor shaft that mimics the load experienced in an actual flight environment. The mechanical apparatus is designed to place a predetermined spring load on the servo shaft to simulate aerodynamic hinge moment loads that increase in proportion to the surface displacement of the mimicked load. To change the spring gradient from one flight condition to another requires cumbersome adjustment since a given setting is only valid for one flight condition. The complexity of the mechanical apparatus is directly proportional to complexity of the simulated mechanical system, increasing in size, weight and cost as the mechanical system complexity increases.

The servo simulator of the present invention replaces the mechanical apparatus and servomotor of prior art systems with an electronic system that mimics the dynamic response of the conventional servo/load apparatus.

SUMMARY OF THE INVENTION

An electronic simulator of a servomotor constructed in accordance with the principles of the present invention provides electrical signals representative of the parameter andd operating variables of the simulated servo system. Signals representing the various elements of torque, including that presented by the load, encountered in actual operation ae combined to establish a net torque signal. This net torque signal is integrated to provide a simulated motor speed signal to the load simulator and applied, after amplification, to the simulated motor input terminals through inductance and resistance elements that mimic the resistance and inductance of an actual servomotor. Since the back emf of the motor is proportional to the motor speed, the signal applied to the input terminals is representative of the back emf encountered by the actual servo system.

DESCRIPTION OF THE PREFERRED EMBODIMENT

Figure 1:
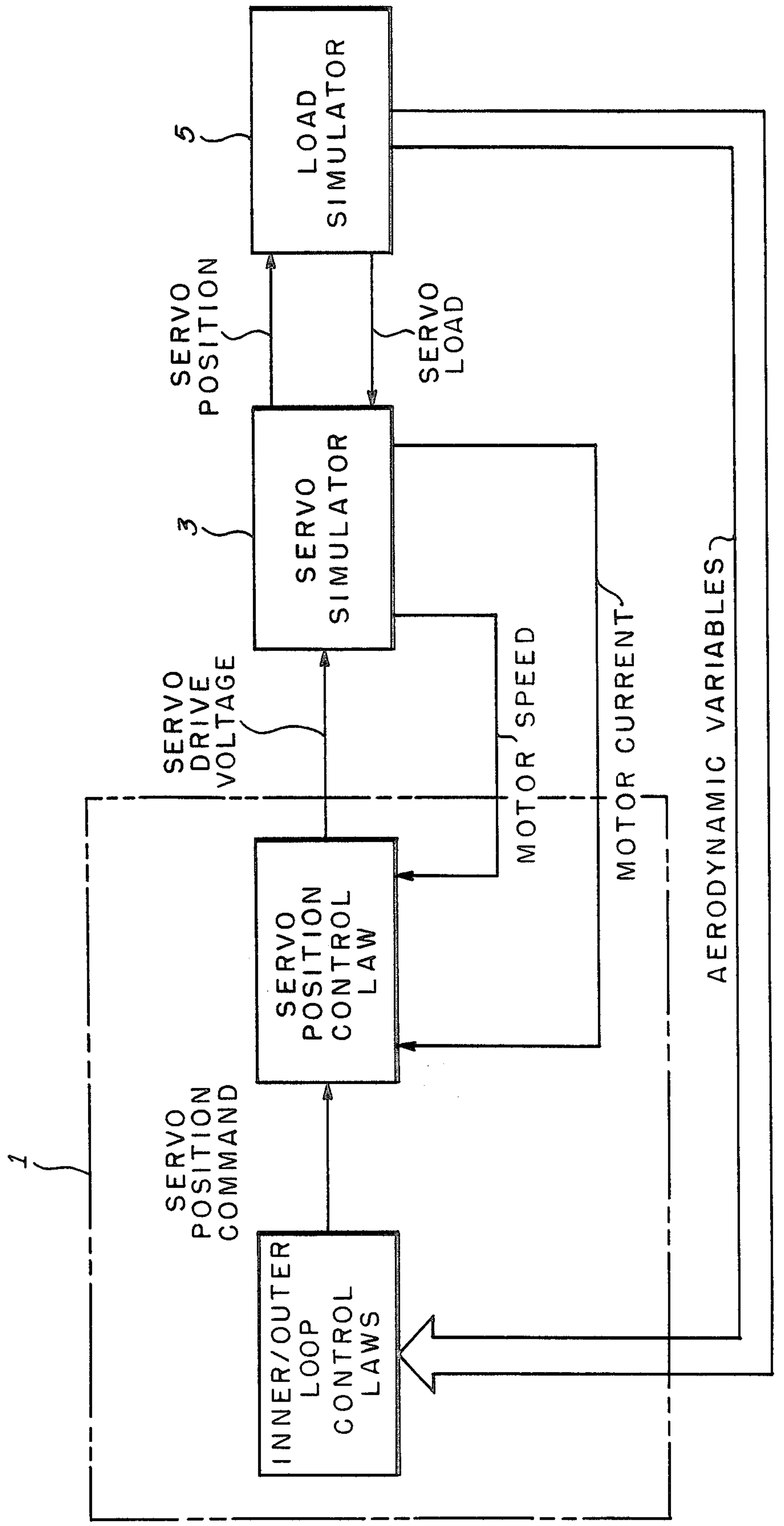
FIG. 1 is a schematic drawing useful in explaining the invention.

FIG. 1 illustrates a typical testing arrangement in which the servo simulator of the invention may be used. For purposes of explanation, the servo simulator will be described in conjunction with an aircraft autopilot system 1. The servo simulator 3, as will be explained, is an electronic analog of a electro-mechanical servomotor that would be used in an actual aircraft environment. This unit produces electrical output signals that actuate a load simulator 5, providing an electrical equivalent to the mechanical loads experienced by the control surfaces of an aircraft under actual operating conditions.

The autopilot receives aerodynamic information from the load simulator and develops servo position command signals. Servomotor current and speed signals from the servo simulator are also received by the autoplot which uses these signals, together with the servo position command signals, to develop a motor drive voltage. This motor drive voltage is used to drive the servo simulator now having a motor load transmitted from the autopilot simulator which has been derived from the flight conditions and the present servo position. The servo simulator then acts on the autopilot to alter the motor drive voltage in accordance with the updated flight conditions. Resulting changes in the servo simulator are sensed by the load simulator which updates the aerodynamic variables and feeds these changed signals to the autopilot to reformulate the servo command.

The load simulator 5 provides an electrical load and feedback signals that interact with the servo simulator and autopilot. This simulation of the forces and loads encountered by a particular aircraft may be provided by a digital computer and straight forward electronic circuits that are adjusted in accordance with programmed instructions from that computer.

It should be noted that a conventional servomotor of the type under consideration is a direct current, permanent magnet field type motor with specified winding resistance and torque ratings. Such servomotors further incorporate an isolated tachometer mounted on the same shaft as the servomotor and having a dc generator with a permanent magnetic field.

Figure 2:
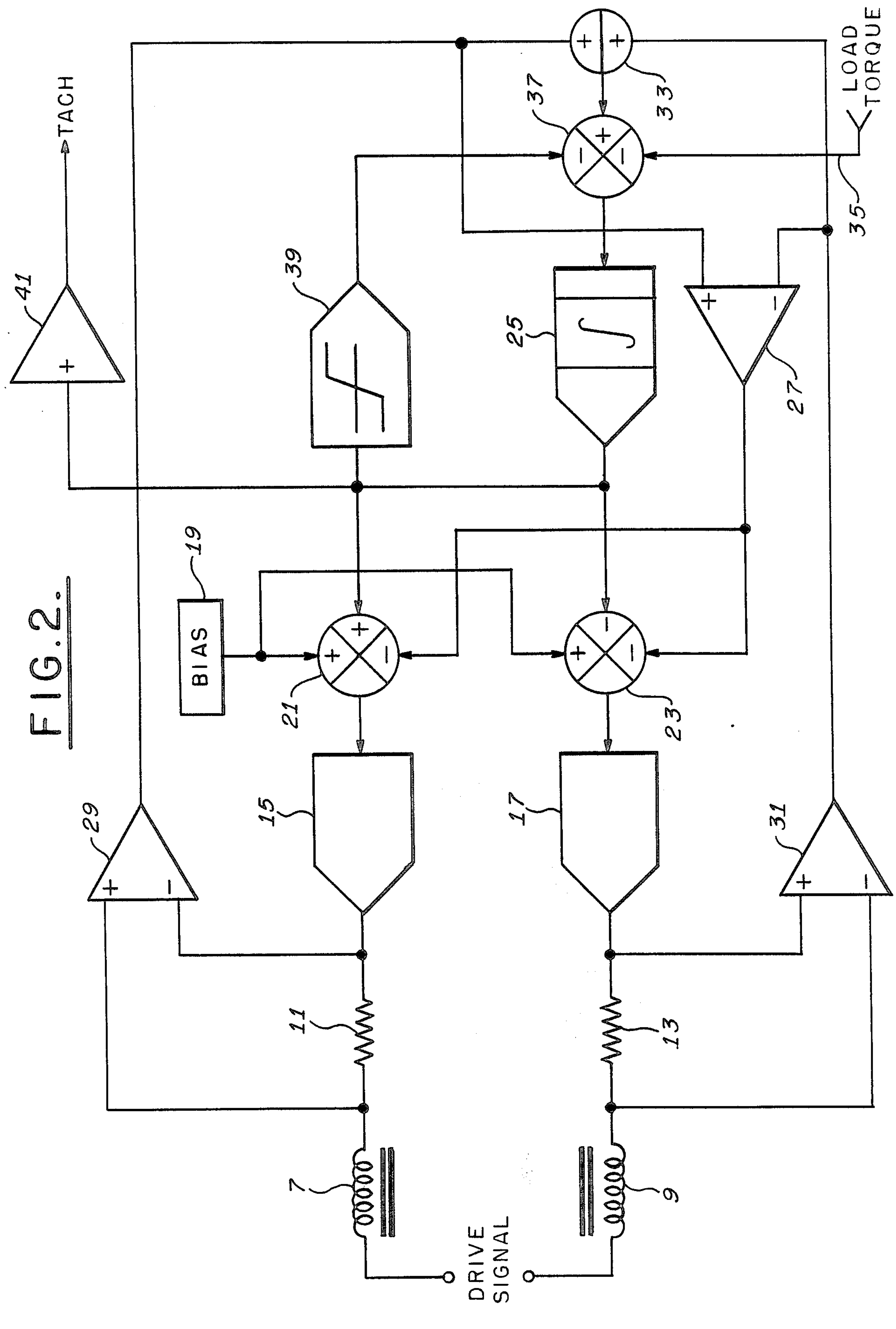
FIG. 2 is a block diagram illustrating a servo simulator constructed in accordance with the principles of the invention.

Referring now to FIG. 2, a servo simulator constructed in accordance with the principles of the invention includes a circuit having components which mimic electrical and mechanical characteristics of an actual servomotor. This circuit is a balanced system, typically operating about a 14 volt bias, suitable for simulating a servomotor that may be driven in either direction, depending upon the polarity of the drive signal generated by the autopilot. Drive signals from the autopilot are applied through a pair of inductors 7 and 9 having the same inductance as that of an actual servomotor, through resistors 11 and 13 equivalent to the resistance of the motor, and then to the output terminals fo a pair of power boost amplifiers 15 and 17. The output of the amplifiers 15 and 17 simulates the back emf generated in an actual servomotor. In general, any amplifier having sufficient bandwidth, drive capacity, and voltage range may be used for the power boost amplifiers.

For example, these amplifiers may have a frequency bandwidth greater than 25 KHz, a current drive greater than 2 amperes, and an output voltage in the range of 1.5 to 26.5 volts in response to a 0–28 volt input signal.

Input voltages to the amplifiers 15 and 17 are derived from three separate sources. The first source is a bias voltage developed in a source 19 applied to the amplifiers through signal combining means 21 and 23 typically adjusted to be 14 volts. The second component of the amplifier input voltages represents motor speed. This component is developed at the output of an integrator 25 and is applied to an addition terminal of combining means 21 and to a subtraction terminal of combing means 23. Thus when the simulated motor speed increases, the output signal from amplifier 15 will increase and the output of amplifier 17 will decrease. The third component of the amplifier input signal is a current balance signal derived from a differential amplifier 27 and applied to subtraction terminals in the combining means 21 and 23. Input signals to the amplifier 27, in turn, are developed in differential amplifiers 29 and 31 which respond to drive currents flowing through resistors 11 and 13 respectively.

It will be appreciated that the drive signal path is through inductor 7 and resistor 11 into the output of amplifier 15, back out of amplifier 17, resistor 13 and inductor 9. Each of the aforementioned resistors represent one-half of a real motor's overall resistance consisting of winding resistance and brush plus commutator block resistance. It can be shown that the torque output of a servomotor is proportional to the motor current. Therefore the sum of the output signals from the amplifiers 29 and 31 are indicative of motor torque. As indicated in FIG. 2, the individual torque signals are added in a signal combining circuit 33 and applied to the input terminals differential amplifier 27. Current balance signals from the differential amplifier 27, resulting from the torque signals, are used to shift the output signals from the amplifiers 15 and 17 in an appropriate direction to balance the two torque signals in the event that a non-symmetrical drive signal is applied to the servomotor.

Torque signals from combining circuit 33 are coupled to an addition terminal of signal combining network 37, while a simulated load torque signals from the load simulator 5 (FIG. 1) are applied through a conductor 35 to a subtraction input terminal of a signal combining circuit 37. This simulated load torque signal mimics the external mechanical forces experienced by an aircraft in flight, such as hinge moment torque arising from aerodynamic surface position, as well as mechanical forces and loads not dependent on control surface positioning. Additionally, signals from a dual slope gain operational amplifier 39, to be described, are applied to a subtraction input terminal of the signal combining circuit 37. Output signals from the combining circuit 37 represent the net torque acting on the rotor of an actual servo motor under specified conditions.

Integrator 25 is designed to have a time constant equivalent to the moment of inertia of the actual servomotor under consideration. Since the signal applied to the integrator from the combining circuit 37 represents net torque, the output voltage of the integrator represents motor speed. The motor speed signal is applied to the power boost amplifiers 15 and 17, to a buffer amplifier 41, as a tachometer signal representative of the motor speed, and to the dual slope gain amplifier 39.

Amplifier 39 simulates the breakout and coulomb frictions characteristic of an actual servo motor. The output of this amplifier is applied in a negative feedback fashion around the integrator and appears to the integrator as a small negative torque signal. This torque signal holds the simulated motor speed to near zero until sufficient drive current torque or external load torque signals are applied to overcome the friction torque feedback signal. Above the breakout point, the output signal from the integrator is increased proportionally with motor speed so as to provide additional negative torque feedback to the integrator in order to simulate the effects of coulomb friction experienced in an actual servomotor.

Figure 3:
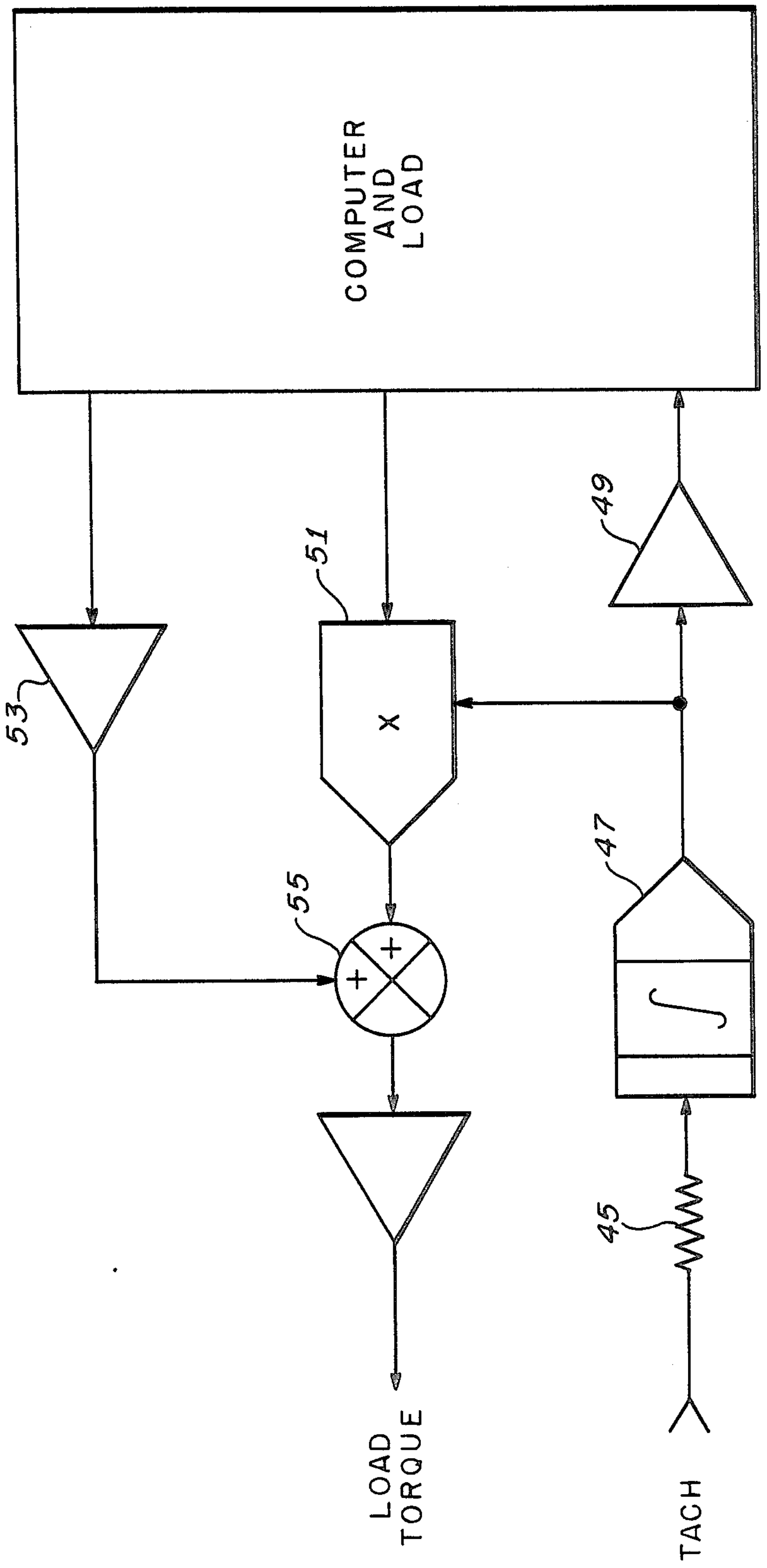
FIG. 3 is a block diagram illustrating the means for coupling the servo simulator to a simulated load.

FIG. 3 illustrates a typical load simulator for the servo simulator.

The motor speed (tach) signal from the servo simulator (FIG. 2) is applied through a rate-adjusting resistor 45 to an integrator 47 to provide a signal which represents the control surface deflection in a real aircraft.

The rate of integration is controlled by resistor 45 which is adjusted so that this rate is equal to the combined servo gearing and aircraft linkage ratios. The resulting deflection signal is buffered by amplifier 49 and applied to the computer-controlled load wherein the resulting displacement torque ratio or gradient is computed. This gradient signal is returned to a multiplier 51 where the gradient signal is multiplied by the surface position signal from the integrator 47. The computer also generates a static torque signal which represents forces and load that are not dependent on surface position. The static torqe signal is applied to a buffer amplifier 53 and applied to a signal combining means 55 together with the output signal from the amplifier 51. The combined output signal is then applied through a buffer amplifier as a load torque signal to the srvo simulator of FIG. 2.

Although the servo simulator of the invention has been described in conjunction with an autopilot and simulated aircraft load, it will be appreciated that the simulator of the invention can be used with any servomechanical control signal source and with other simulated loads.

Similarly, although a balanced servo simulator has been described, the same principles are applicable to a single polarity drive signal system wherein a single inductor and resistor would be used to receive the drive signal. Furthermore only one power boost amplifier would be needed in such a system.

While the invention has been described in its preferred embodiments, it is to be understood that the words which have been used are words of description rather than limitation and that changes may be made within the purview of the papended claims without departing from the true scope and spirit of the invention in its broader aspects.

We claim:

1. An apparatus for electronically simulating operating characteristics of a servomotor comprising:

input means for receiving drive signals from an external control source;

inductance and resistance means serially coupled to said input means and having inductance and resistance values equal to that of said servomotor;

torque means coupled to said resistance means for providing first and second torque signals representative of torques applied to said servomotor;

motor speed means coupled to receive said first torque signals for providing motor speed signals representative of motor speeds of said servomotor;

frictional forces means coupled to receive said motor speed signals for providing signals representative of frictional forces experienced by said servomotor to said motor speed means;

means for providing bias signals; and back emf means coupled to receive said second torque signals, said motor speed signals and said bias signals and coupled to said input means via said resistance and inductance means for providing signals representative of back emf generated by said servomotor to said input means.

2. The apparatus of claim 1 wherein said torque means includes a differential amplifier means coupled across said resistance means to provide output voltages proportional to current flowing through said resistance means, said output voltages being coupled to said motor speed means.

3. The apparatus of claim 2 wherein said frictional forces means includes a dual slope gain amplifier coupled to receive said motor speed signals and coupled to provide signals representative of frictional forces experienced by said servomotor to motor speed means.

4. The apparatus of claim 3 wherein gain characteristics of said dual slope gain amplifier are selected to hold said motor speed signals near zero until torque signals exceed said signals representative of frictional forces, thereby simulating breakout points of said servomotor.

5. The apparatus of claim 4 wherein said gain of said dual slope gain amplifier is further selected to provide uniform gain for simulated conditions above breakout points.

6. The apparatus of claim 5 further including means for coupling said motor speed signals to an external load simulator and for coupling simulated external torque signals representative of torques experienced by a simulated external load to said motor speed means.

7. The apparatus of claim 6 wherein said first torque signals are coupled to non-inverting input terminals of said motor speed means and said signals representative of frictional forces and said external torque signals are coupled to inverting input terminals of said motor speed means.

8. The apparatus of claim 7 wherein said external load simulator provides signals representative of loads experienced by an aircraft autopilot under specified aircraft operating conditions.

9. The apparatus of claim 7 wherein said back emf means includes first and second amplifiers, each having an output terminal coupled through a corresponding resistor and inductance of said resistance and inductance means and to a corresponding terminal of said input means, and wherein said torque means includes third and fourth amplifiers each respectively responsive to current flowing through first and second resistors of said resistance means, output signals from said third and fourth amplifiers being coupled to a differential amplifier having an output terminal whereat said second torque signals are generated.

10. Electronic apparatus for simulating operating characteristics of a servomotor comprising:

input means for receiving drive signals from an external control source;

inductance and resistance means serially coupled to said input terminals and having inductance and resistance values equal to inductance and resistance values of said servomotor;

amplifier means having output terminals coupled to said inductance and resistance means for providing simulated back emf signals to said input means;

a signal integrator having a time constant respresentative of inertia inherent in said servomotor;

signal combining means for coupling a combination of several individual simulated torque signals to input terminals of said amplifier means through said integrator;

dual slope gain amplifier means coupled through said combining means to said integrator in a negative feedback relationship, such that an integrated net torque signal representative of said servmotor's rotor speed is provided, said dual slope gain amplifier having a gain selected to provide signals representative of frictional forces experienced by said servomotor at said rotor speed;

input current-responsive amplifer means coupled to said resistance means for producing an output voltage proportional to current levels flowing through said resistance means and having a gain adjusted such that said output signal represents motor torque at said current levels;

means for applying said output signal to said signal combining means;

means for applying an externally generated load torque voltage to said signal combining means; and buffer amplifying means coupled to said integrating means for providing a tachometer signal to external load means.

* * * * *